March 1, 1960  A. S. CLARK  2,926,723
MECHANISMS FOR APPLYING HOT ADHESIVES FOR BONDING
Filed Feb. 4, 1955  3 Sheets-Sheet 1

Inventor
Alfred S. Clark
By his Attorney

March 1, 1960 A. S. CLARK 2,926,723
MECHANISMS FOR APPLYING HOT ADHESIVES FOR BONDING
Filed Feb. 4, 1955 3 Sheets-Sheet 2
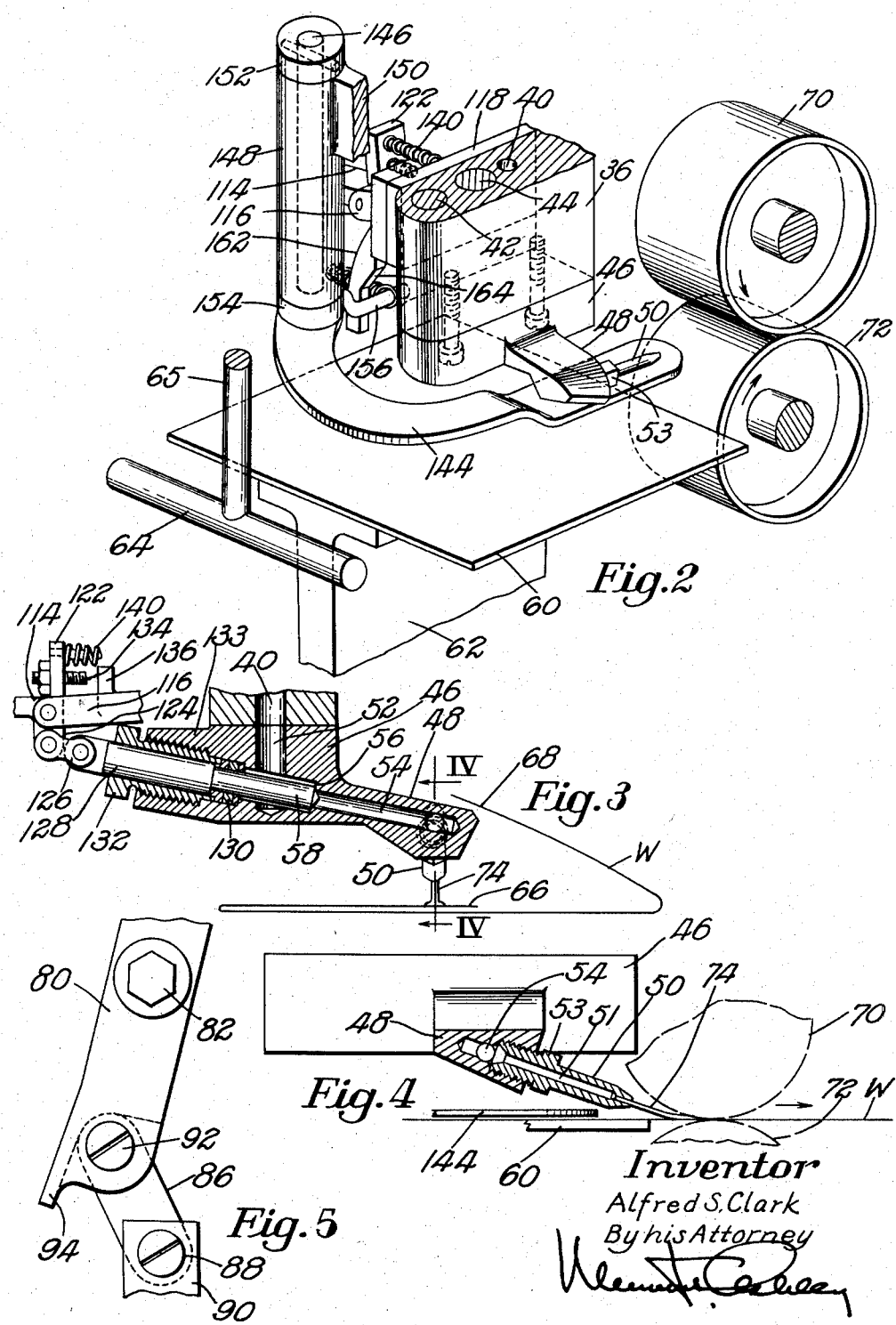
Inventor
Alfred S. Clark
By his Attorney March 1, 1960 A. S. CLARK 2,926,723
MECHANISMS FOR APPLYING HOT ADHESIVES FOR BONDING
Filed Feb. 4, 1955 3 Sheets-Sheet 3
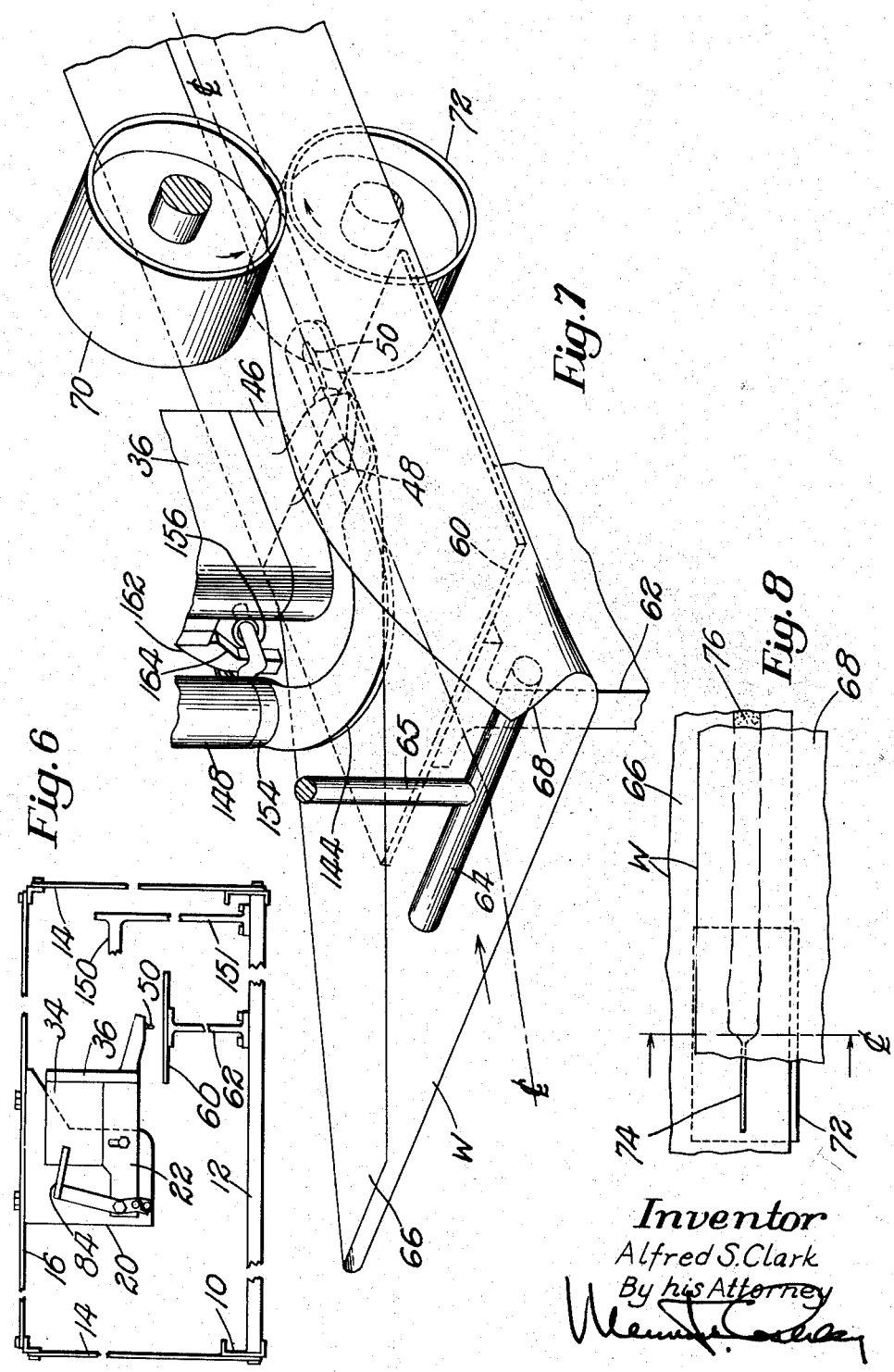
Inventor
Alfred S. Clark
By his Attorney

United States Patent Office 2,926,723
Patented Mar. 1, 1960

2,926,723

MECHANISMS FOR APPLYING HOT ADHESIVES FOR BONDING

Alfred S. Clark, Beverly, Mass., assignor to United Shoe Machinery Corporation, Flemington, N.J., a corporation of New Jersey Application February 4, 1955, Serial No. 486,157

4 Claims. (Cl. 154—42)

This invention relates to adhesive-handling mechanisms for applying a hot adhesive material which aids in forming a seam or bond between thin unsupported films of plastic material such as polyethylene.

The use of thin, unsupported films of plastic material for the formation of bags and other containers has become widespread because of the many desirable characteristics of such films. These characteristics include a considerable strength at room temperatures, and the fact that the material is both moisture proof and inert to most chemicals and solvents at ordinary temperatures. The material is used in films, some of which have a thickness of only one or two thousandths of an inch and, at these thicknesses, are somewhat stretchy.

Machines are in use which form a seam between opposite margins of a web of such material, as by applying heat and then pressing the margins together, but the handling of such films is difficult, especially when they are traveling at high speeds as is necessary in order to meet competitive costs. One of the commonest ways of making a bond between the opposite margins is to apply heat to one or both margins of the film as, for example, by means of radiation. This is, however, subject to the disadvantage that the material employed in the films exhibits a difference of only a few degrees in temperature between conditions in which the material is too soft or too solid. When it is too soft it is apt to melt and tear readily and when it is too solid it will not weld together to form a truly continuous seam. With relatively thick films, the use of radiant heat to make a seam is inefficient as the speed of handling must be quite slow to allow the heat to penetrate the film. It should be noted, too, that the dielectric characteristics of polyethylene are such that a high frequency electric field will not induce internal bonding heat.

Satisfactory seams may not be formed by the use of most adhesive materials partly because of the waxy paraffin-like character of the polyethylene surfaces. Furthermore, in view of the fact that the seam may only be completed by the application of both heat and pressure, it is necessary to employ a very careful temperature control for the delivered adhesive.

Thermoplastic adhesives are available, which, when applied to the web at the proper temperature and in adequate quantities, will deliver enough heat to make a bond which is not only continuous but is strong and lasting under the varied conditions of use of the containers being made. One such material, which is adapted to be distributed to users in the form of a continuous rod-like strip, is a polyethylene type of adhesive containing other resins wherein the temperature of the melted adhesive is substantially above the melting point of the film and in which the quantity deposited carries sufficient heat to melt the surface portions only of said film to cause amalgamation, e.g., a mutual solution of the adhesive and said surface portions.

With these factors in mind, an important object of the invention is to devise an improved mechanism for handling such adhesives as a step in the process of forming a seam between spaced portions such as the opposite margins of a web of unsupported polyethylene material.

Inasmuch as the temperatures required to effect a satisfactory bond are in the neighborhood of 325 to 375° F., it will be seen that the applying apparatus must be heated to a temperature somewhat in excess of this range of temperatures to avoid chilling the material before it is applied and that such temperatures are sufficiently high to very quickly melt the polyethylene film in case of accidental contact between the latter and a nozzle, for example. Accordingly, in the herein illustrated machine, the device for applying the adhesive comprises a heated nozzle arranged to extrude a thin, narrow stream of hot material upon the fast running web without any contact between the material and the nozzle.

An arrangement of this sort precludes any great separation between the nozzle and the film, and during stoppages of the machine the heat of the nozzle may readily damage the adjacent film. For such reasons, it is difficult to thread the film through the machine without accidental contact with the heated apparatus.

Thus, a feature of the invention resides in the provision of a movably mounted nozzle carrier constructed to be electrically interlocked with an electrically controlled power drive for feeding the film, to the end that movement of the nozzle carrier toward the work is effective to control the driving means so as to start the movement of the film before the heated nozzle reaches its operating position over the work. Conversely, the interlocking mechanism insures a movement of the nozzle away from the work upon any intentional or accidental stoppage of the feeding mechanism therefor.

Another feature of the invention resides in a movable drip catcher which is automatically positioned under the nozzle as the latter is moved away from the work.

These and other features of the invention will best be understood in a consideration of the following specification taken in connection with the accompanying drawings, in which Fig. 1 is an angular view showing my novel handling mechanism and a control therefor;

Fig. 2 is an angular view from the right of Fig. 1 to show the applying nozzle for the cement together with an antidrip device associated therewith;

Fig. 3 is a vertical section through the nozzle carrier taken along the center line of a valve controlling a passage to the nozzle;

Fig. 4 is a detail view taken in section on the line IV—IV of Fig. 3;

Fig. 5 is a detail, in elevation, of a toggle shown in Fig. 1;

Fig. 6 is a diagrammatic vertical cross section through a bag making machine upon which my handling mechanism has been mounted;

Fig. 7 is a view similar to Fig. 2, but showing a web of material passing through the mechanism; and Fig. 8 is a plan view of overlapping margins of a web of material passing through squeezing rolls which spread out the cement deposited by the nozzle.

Figure 1:
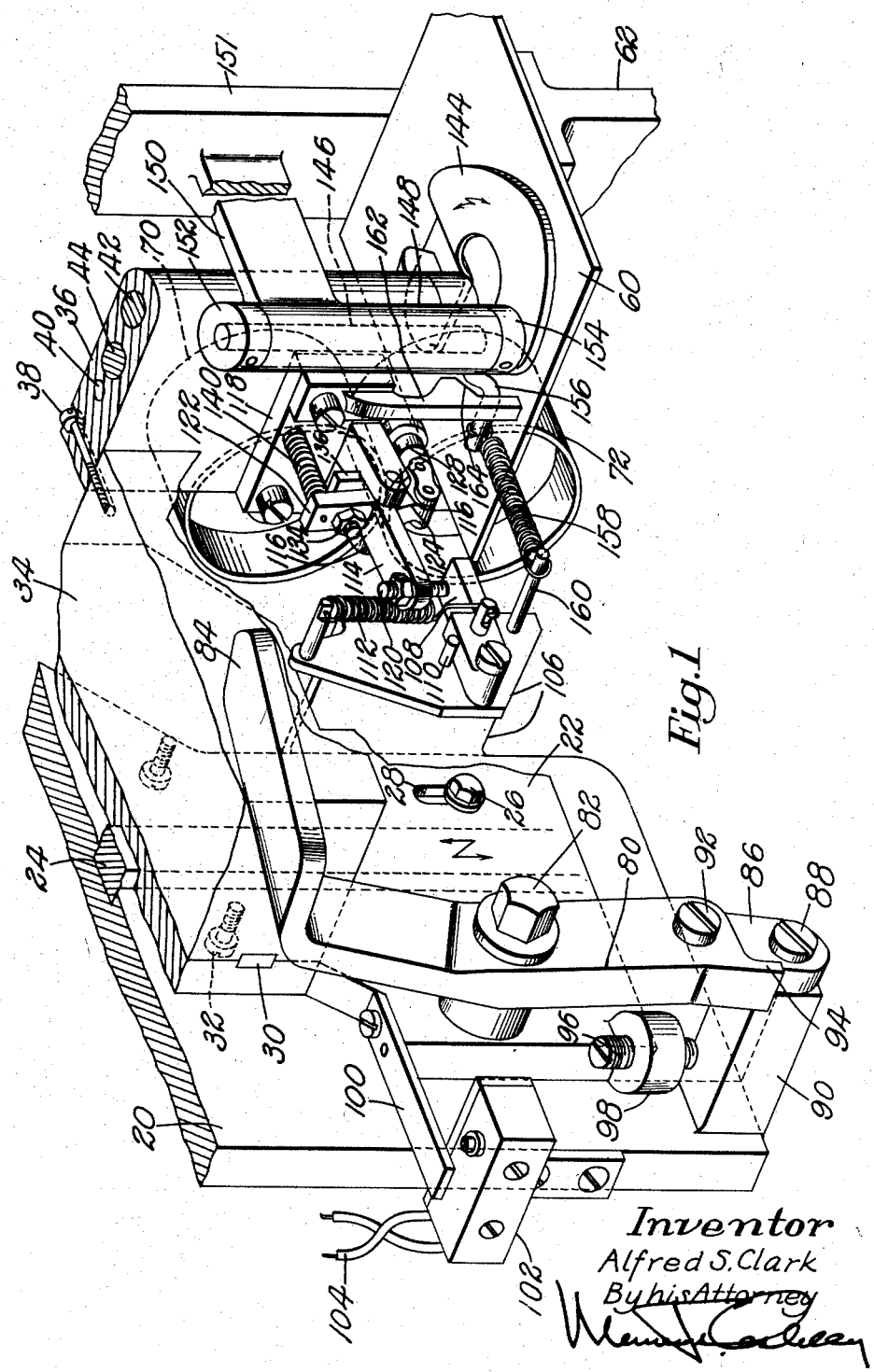

The cement handling mechanism to be described may be associated with various types of bag making machinery and especially those which form a tube of the plastic material capable of being cut up in short pieces each bonded transversely to form bags. As shown diagrammatically in Fig. 6, a typical structure of such a bag making machine comprises a rectangular side frame 10 having a base 12 and provided with uprights 14 upon which an overhead bridge member 16 is mounted. Upon such a bridge member, for example, may be hung my apparatus comprising a back plate 20, supporting a slide 22 which is guided upon a key 24 (Fig. 1) and is held in position with respect to the back plate by retaining screws such as that shown at 26 which pass through slots 28 in the slide. Upon this slide there is supported, as by means of a key 30 and retaining screws 32, a cement-melting and delivering mechanism 34 shown here simply as a rectangular casing. On one side of this casing there is supported a plate 36 which is secured to the melting and delivering mechanism 34 in any desired fashion as by the screw 38.

In this plate there is a cement passage 40 to which cement is delivered in a molten condition by the mechanism 34. The temperature of this plate may be controlled by means of an electric heating unit 42 energized under the control of a thermostat 44. At the lower end of this place 36 there is attached a nozzle carrier 46 (Fig. 3) which has an arm 48 extending laterally from the carrier 46 and in this there is threaded a nozzle 50 which is heated by conduction from the hot control plate 36. This nozzle points forwardly with respect to the direction of movement of the web W of material and slightly downwardly (Fig. 4) at an angle usually less than 30° to the horizontal. The nozzle 50 is pointed and has a passage 51 terminating in a still smaller outlet opening. The nozzle also has a wrench-receiving hexagonal enlargement 53. Contrary to usual practice, the nozzle does not touch the work. Cement forced through the vertical passage 40 enters an extension 52 thereof which merges with a lateral passage 54. The latter is provided with a shoulder 56 against which there may be seated the pointed end of a control valve 58 when it is desired to stop the flow of cement.

A thermoplastic adhesive manufactured in the form of a flexible rod and to which reference has been made above, may be delivered in molten condition by a known melting and delivering mechanism 34 including means for feeding a rod received from a source of supply to a heated casing in which there is a driven disk melting and carrying the cement through an elongated tapered path extending around the periphery of the disk and leading it to an outlet from which it is delivered to the passage 40. Included in this mechanism are means for regulating the temperature of the casing and the speed of rotation of the disk, whereby the quantity of cement delivered and its temperature may be continually controlled to suit the needs of the particular work being handled by my novel cement-handling mechanism. If more pressure is required, a gear pump may be used and inserted in the path of the cement at the casing outlet.

It will be understood that bag tubing machines in which the web of material is formed into a tube by joining the margins to form a side seam, are arranged in various fashions. However, one of the commonest arrangements involves feeding and guiding mechanisms which carry the plastic web W, along a path indicated by a dot and dash center line shown in Fig. 7, at speeds up to three-hundred feet per minute, over a supporting table 60 which is diagrammatically shown in Fig. 6 as supported upon the base of the machine by means of a post 62. The web passes under a cross bar 64 of the tubing machine carried by a hanger rod 65 and its margins are turned in so that one margin 66 passes over the cross bar but under the nozzle 50 thereby to enable a stream of cement 74 to be deposited upon its supper surface. The other margin 68 is guided over the cross bar 64 and above the nozzle so that it overlaps the cement-receiving margin 66 and may be pressed against it to form a seam.

Because of the quick cooling properties of the thermoplastic cement employed, it is desirable to place the sealing apparatus closely adjacent to squeeze rolls 70 and 72 of the tubing machine which may form part of the feeding mechanism thereof and which are yieldingly pressed together so that they squeeze the bond between the margins of the work. The velocity of the stream of cement 74 (Fig. 4) deposited upon the margin 66 is approximately that of the web W for if it were not, the quantity of cement upon the work would vary, being elongated as the work moves faster or stacked up as the work is moving slower. This point of the deposit of the cement is so close to the squeeze rolls that the upper margin 68 is brought against the cement immediately and by reason of the pressure between the two rolls operates to spread the stream 74 laterally into a thin band 76 (Fig. 8).

It will be noted that the bonded margins of the film lie directly above the body of the web W so that the action of the squeeze rolls necessarily presses those portions against the web W. I have found, however, that by a proper adjustment of the controls of the melting and delivering mechanism 34 and of the controls for the nozzle supporting plate 36, the heat in the cement will melt the adjacent surfaces only of the margins, thereby causing amalgamation, i.e., a mutual solution of the cement and the said surfaces, but without transferring to the underlying web sufficient heat to cause the under surface of the margin 66, for example, to stick to the web beneath it.

To provide an additional protection against spoilage of the work, the apparatus includes an arrangement for making sure that the starting and stopping of the feed of the work occurs in a predetermined sequence with respect to the opening and closing of the valve 58 which controls the flow of cement from the nozzle. It will be seen that the danger is less if the movement of the work has started before the cement has been deposited. The illustrated arrangement also includes a mechanism providing for a slight vertical movement of the nozzle to carry it away from the work before the latter stops and a lowering of it to the best position with respect to the work after the latter starts thereby avoiding danger of damage to the plastic material by reason of contact between said material and the heated nozzle.

To this end, the slide 22 is interconnected with the back plate 20 by a toggle, the upper link 80 of which is pivoted upon a stud 82 extending forward from the face of the slide. This link has a flange 84 forming a convenient handle for actuating the toggle. The lower link 86 of the toggle is pivoted on a screw stud 88 threaded in an arm 90 which is integral with the back plate 20 and the two links are joined by a pin 92. It will be noted further that the upper link of the toggle has a depending laterally bent lip 94 which, when the connecting pivot 92 passes dead center, comes against the side face of the lower link 86 and leaves the toggle in stable condition when the slide is elevated. A stop screw 96 threaded in a lug 98 integral with the slide 22 is positioned to engage the arm 90 to determine the lowermost position of the slide 22.

A laterally extending plate 100 (Fig. 1) fastened to the slide is arranged to operate an electrical switch 102 having leads 104 which are connected to a control source (not shown) for energizing electrical driving apparatus of the web handling machine, including the squeeze rolls 70 and 72 thus interlocking the drive with the nozzle position and the position of a control valve to be described. The position of this arm 100 is so selected that the electrical drive starts these and other feeding rolls in motion before the slide reaches its lowermost position, as determined by the screw 96, in which the nozzle is in correct position to coat the work.

There is also provided an arrangement for operating the valve 58 in the desired sequence with respect to the movement of the slide 22 and to this end the back plate 20 is provided with a forwardly and laterally extending bracket 106 upon which there is mounted a yieldable stop member 108. This is pivoted on said bracket 106 and is normally held up against a stop pin 110 therein by a coil spring 112. Cooperating with this stop plate is a bell crank 114 pivotally mounted between lugs 116 which extend laterally from a plate 118 attached by screws to the back face of the nozzle-supporting plate 36 which moves up and down with the slide 22.

This bell crank 114 has an abutment screw 120 at its outer end to engage the stop 108. It is also provided with an upwardly extending flange 122 and a depending finger 124. The finger is joined by a link 126 (Fig. 3) to the outer end of a slide 128 integral with the control valve 58 and to prevent leakage of molten cement which is under a considerable pressure, this rod 128 is surrounded by a packing 130 compressed by a gland 132 threaded in a boss 133 projecting from the plate 36. The open position of the control valve 58 is determined by a stop screw 134 threaded in the upwardly extending flange 122 of the bell crank and contacting a lip 136 between and integral with the lugs 116 in which the bell crank is pivoted.

The bell crank 114 is normally urged counterclockwise to close the control valve 58 by means of a coil spring 140 which is supported on a stud in the flange 122 and rests against the plate 118. By this arrangement, a movement of the slide 22 to its upper position with respect to the back plate 20 raises the plate 118 carrying the screw 120 away from the stop 108 so that the spring 140 is free to close the control valve 58 while a movement of said slide to its lower position by operation of the toggle 80 is effective to open the control valve.

The closing of the control valve leaves a small amount of cement in the passage 54 and in the passage of the nozzle 50 which might drip on the work and damage it. However, I have provided a drip-catching plate 144 which may be swung into the position shown in Figs. 2 and 4 where it underlies the end of the nozzle. This plate is curved and is supported upon the lower end of a vertical rod 146 journaled in a bearing sleeve 148 which occupies a fixed position in the machine, being supported by a lateral arm 150 which is carried by a vertical post 151 (Figs. 1 and 6) which is supported in any desired manner as by attachment to the base 12 of the bag tuber. The pivot rod 146 is held in position within the sleeve 148 by a collar 152 at the top and a collar 154 at the bottom, this latter being made part of the drip catching member 144.

The collar 154 is provided with a laterally extending arm 156 urged in a counterclockwise direction, as viewed from above, by a coil spring 158 (Fig. 1) extending between the arm and a pin 160 mounted upon the bracket 106 which extends forwardly from the back plate 20. Associated with the arm 156 is a depending operating finger 162 attached at its upper end to the plate 118 and provided with a cam surface 164. It will be recalled that this drip catcher and its arm 156 occupies a fixed horizontal position whereas the plate 118 and hence the operating finger 162 move up and down as the machine is started and stopped. Consequently, the cam surface 164 operates to allow the spring urged drip-catching plate 144 to rotate into operative position beneath the nozzle when the slide is moved up and to push it away therefrom to a position such as that shown in Fig. 4 when the slide is moved down to start the machine.

In the operation of the machine, the web W of plastic material is threaded into the guides of the bag tuber and its margins are doubled over so that they may be entered along with the body of the web between the squeeze rolls 70 and 72 to form a seam. Then, assuming that the melting mechanism 34 and the nozzle carrier plate 36 are brought to operating temperature, the slide 22 is lowered when the handle 84 of the link 80 of the toggle formed by links 80, 86 is moved to break this toggle, thereby to allow the slide to move downward carrying the nozzle into operative relation to the work and withdrawing the drip catcher. As the slide goes down, the closing of the switch 102 will start the web in motion and the contact of the screw 120 in the bell crank 114 with the stop 108 upon the back plate will rotate the bell crank to draw back the control valve 58 and start the out-flow of cement in a stream deposited on the rapidly moving film.

Having thus described my invention, what I claim as new and desire to secure by Letters Patent of the United States is:

1. In a machine for seaming marginal portions of heat sensitive unsupported polyethylene plastic film material, a heated nozzle mounted for movement to be presented to said marginal portions at an operative position separated therefrom or to be withdrawn from that position, means for thus moving the nozzle, feeding mechanism adapted to feed and to bring together, along paths spaced by an acute angle and in a location adjacent to said operative position of the nozzle, portions of film which are to be seamed, and mechanism for so controlling the feeding mechanism and the nozzle moving means that the feeding mechanism is started before the nozzle is presented to the operative position and the nozzle is withdrawn from said position before the feeding mechanism brings said portions to a stop.

2. In a machine for adhesively seaming portions of a web of material, a power-operated feeding mechanism, an electric switch controlling said feeding mechanism, means including a nozzle for delivering a stream of heat responsive adhesive material to the work, movable means for supporting said nozzle to carry it toward and away from an operating, cement-delivering position, a movable valve for said nozzle, and means interconnected with said switch for moving the nozzle to operating position, opening the valve for the nozzle, and starting the feeding mechanism in a predetermined sequence.

3. In a machine for adhesively seaming superposed film portions, electric-power-operated means for feeding said film portions, a switch controlling said power-operated means, a movable support, a heated nozzle on said support arranged to deposit a stream of heat-responsive adhesive material on one of the film portions from an operating position spaced from the film, means for guiding one film portion in a path beneath said nozzle, means for guiding the other film portion over the nozzle and into contact with the coated portion of the lower film, and means for interlocking said switch with the movable nozzle support arranged to close the switch to start the work feed before the nozzle reaches operating position.

4. In a machine for attaching superposed film margins, a movable support, a heated nozzle on said support arranged to squirt a stream of melted adhesive material on one film margin, means for guiding said margin in a path beneath said nozzle, means for guiding the other margin over the nozzle and then into contact with the lower margin, a swingably mounted drip catcher movable into position beneath the nozzle when it is separated from the work, and means movable with said nozzle support arranged to push aside the drip catcher as the nozzle is carried toward the work.

References Cited in the file of this patent

UNITED STATES PATENTS

| | | |
|---|---|---|
| 1,278,329 | Goetze | Sept. 10, 1918 |
| 2,195,475 | Wallace et al. | Apr. 2, 1940 |
| 2,206,965 | Lakso | July 9, 1940 |
| 2,357,201 | Hornbostel | Aug. 29, 1944 |
| 2,519,102 | Bergstein | Aug. 15, 1950 |
| 2,576,622 | McBride et al. | Nov. 27, 1951 |
| 2,589,929 | Dildilian et al. | Mar. 18, 1952 |
| 2,616,482 | Barnes | Nov. 4, 1952 |
| 2,664,938 | Torr | Jan. 5, 1954 |
| 2,670,783 | Moravec et al. | Mar. 2, 1954 |
| 2,708,278 | Kamborian | May 17, 1955 |